US007843882B2

(12) United States Patent
Samuel et al.

(10) Patent No.: US 7,843,882 B2
(45) Date of Patent: Nov. 30, 2010

(54) SOFT VERTICAL HANDOVERS IN WIRELESS NETWORKS

(75) Inventors: Louis G. Samuel, Swindon (GB); Frederic Battaglia, Middletown, NJ (US); Theodore Sizer, Little Silver, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1144 days.

(21) Appl. No.: 10/923,959

(22) Filed: Aug. 23, 2004

(65) Prior Publication Data

US 2006/0039327 A1 Feb. 23, 2006

(51) Int. Cl.
*H04W 4/00* (2009.01)
*H04W 36/00* (2009.01)

(52) U.S. Cl. ................... 370/331; 370/338; 455/442

(58) Field of Classification Search ........... 455/41.2, 455/41.3, 507, 436, 440, 443, 442, 438, 452.1; 370/331, 338

See application file for complete search history.

(56) References Cited

U.S. PATENT DOCUMENTS

| 6,243,581 | B1 * | 6/2001 | Jawanda ................ 455/432.2 |
| 6,256,501 | B1 * | 7/2001 | Tokuyama et al. ......... 455/442 |
| 6,856,611 | B2 * | 2/2005 | Chaudhuri et al. ......... 370/335 |
| 6,904,029 | B2 * | 6/2005 | Fors et al. ................. 370/331 |
| 6,925,074 | B1 * | 8/2005 | Vikberg et al. ............ 370/338 |
| 6,993,359 | B1 * | 1/2006 | Nelakanti et al. ......... 455/554.1 |
| 7,085,294 | B2 * | 8/2006 | Longoni et al. ........... 370/509 |
| 7,200,112 | B2 * | 4/2007 | Sundar et al. ............. 370/230 |
| 7,308,263 | B2 * | 12/2007 | Gallagher et al. ......... 455/439 |
| 7,583,632 | B2 * | 9/2009 | Janevski et al. ........... 370/331 |
| 2002/0067707 | A1 * | 6/2002 | Morales et al. ............ 370/331 |
| 2002/0131387 | A1 * | 9/2002 | Pitcher et al. ............. 370/338 |
| 2003/0026269 | A1 * | 2/2003 | Paryani .................... 370/401 |
| 2004/0072593 | A1 * | 4/2004 | Robbins et al. ............ 455/560 |
| 2005/0226185 | A1 * | 10/2005 | Tell et al. .................. 370/331 |
| 2005/0227691 | A1 * | 10/2005 | Pecen et al. ............. 455/435.2 |
| 2005/0239441 | A1 * | 10/2005 | Eronen .................... 455/411 |
| 2005/0265279 | A1 * | 12/2005 | Markovic et al. .......... 370/328 |
| 2006/0019667 | A1 * | 1/2006 | Hicks, III ................. 455/445 |
| 2006/0039332 | A1 * | 2/2006 | Kotzin ..................... 370/338 |
| 2006/0094431 | A1 * | 5/2006 | Saifullah et al. ........... 455/436 |

FOREIGN PATENT DOCUMENTS

| EP | 1 411 670 A1 * | 4/2004 |
| EP | 1411670 A1 * | 4/2004 |

OTHER PUBLICATIONS

European Search Report EP 05 25 5122 dated Nov. 10, 2005.

* cited by examiner

*Primary Examiner*—George Eng
*Assistant Examiner*—Brandon J Miller
(74) *Attorney, Agent, or Firm*—Williams, Morgan & Amerson

(57) ABSTRACT

The present invention provides a method is provided for soft vertical handovers. The method includes requesting a handover from a first wireless network that operates according to a first protocol to a second wireless network that operates according to a second protocol, the first protocol being different than the second protocol, via a first wireless telecommunication link that operates according to the first protocol. The method also includes forming, in response to the handover request, a second wireless telecommunications link according to the first and second protocols, the second wireless telecommunications link being concurrent with the first wireless telecommunication link. The method further includes dropping the first wireless telecommunications link after forming the second wireless telecommunications link.

12 Claims, 3 Drawing Sheets

SOFT VERTICAL HANDOVERS IN WIRELESS NETWORKS

BACKGROUND OF THE INVENTION

1. Field of the Invention

This invention relates generally to telecommunication systems, and, more particularly, to wireless telecommunication systems.

2. Description of the Related Art

The list of devices that use wireless communication techniques, such as a cellular telephone system and/or a Bluetooth-enabled wireless local area network (WLAN), to transmit voice and data signals has expanded dramatically in recent years to include, among other things, cell phones, personal data assistants, global positioning system receivers, laptop computers, and desktop computers. And the number of devices on the list, as well as the services they are likely to provide, is expected to continue to grow. The proliferation of wireless communication systems has led users to expect uninterrupted access to these systems and/or networks at virtually any time and in virtually any place.

Many wireless devices are able to communicate with a variety of different systems and/or networks. For example, a mobile phone may be able to establish a first wireless communication link with a base station in a cellular telephone system that operates according to the Universal Mobile Telephony System (UMTS) protocol while a user is outdoors. The same mobile phone may also be able to establish a second wireless communication link with an access point of a wireless local area network that operates according to the Bluetooth protocol when the user is in a "hot spot" associated with the access point. For another example, a mobile phone may be able to establish a first wireless communication link with a base station in a first cellular telephone system that operates according to the UMTS protocol while a user is in a first cell associated with the first base station. When in a second cell, the same mobile phone may also be able to establish a second wireless communication link with a second base station that operates according to a Global System for Mobile telecommunications (GSM) protocol.

Currently, voice communications are treated as fixed to a given system. For example, if a voice call is made on a GSM system, the voice call usually resides within the GSM domain for the duration of the call. It is unusual to handover the call to another system. However, if a handover from a first system to a second system, or between portions of the first system, is necessary or desirable, the handover is usually performed in a hard or "vertical" manner. For example, during a vertical handover from a GSM system to a UMTS system, the call is stopped on the GSM system and re-established on the UMTS system. For another example, during a hard handover from a first frequency to a second frequency of a UMTS system, the call stopped on the first frequency and re-established on the second frequency of the UMTS system. It should be noted that in both cases there is a complete break in the delivery of the voice as it is transferred to the new system or placed to another part of the same system.

Although vertical and/or hard handovers are typically considered adequate for conventional systems in which the handover is unlikely, e.g. handovers from GSM to UMTS systems, these conventional handover techniques have a number of disadvantages when applied to systems where voice calls may be handed over frequently, or even nearly continuously. For example, considerations such as convenience and price of delivery may make it desirable to handover voice calls frequently, or nearly continuously, in so-called "network of network" philosophies that will appear in $4^{th}$ Generation wireless systems, which include many systems that compete (or collaborate) to deliver voice service. However, if a real time service (such as voice) is running at the time of the handover, the service will be impeded because of the discontinuity that arises when the service is stopped and then re-established. The discontinuity may become a time disconnect that could result in the call being interrupted or dropped.

The first and second systems participating in the handover may be classified according to the relative "tightness" or "looseness" of the coupling between the two systems. For example, the tightness or looseness of the inter-working between the first and second networks may refer to whether the delay (or latency) between the two networks can be controlled to within some predefined bound. If the bound on the delay is relatively large, the coupling is loose; if the bound on the delay is relatively small, the coupling is tight. Accordingly, tightly coupled systems may provide a "delay-guaranteed" handover and loosely coupled systems may provide a "best-effort" handover.

The tightness or looseness of coupled systems may also refer to the ability of one or both of the systems to direct data from a central point to an end point within the networks. For example, tightly coupled systems may include a routing path that includes a router known to, and controllable by, both systems. In contrast, loosely coupled systems may include a routing path that includes one or more routers that one of the systems has no knowledge of, or control over. The tightness or looseness of coupled systems may also refer to the ability of the systems to perform authentication from the second network back to the first network. For example, authentication of messages in tightly coupled systems may be managed directly because the second network is an extension of the first network, whereas authentication of messages in loosely coupled systems may not be managed directly because the second network is not an extension of the first network. Furthermore, mobility within tightly coupled systems may be managed by a foreign agent that is owned by the operator, whereas mobility within loosely coupled systems may be managed by a foreign agent that is not owned by the operator The likelihood that a call will be interrupted or dropped during a handover depends, at least in part, on the relative tightness or looseness of the connection between the systems participating in the handover. For example, if the first system is tightly coupled to a second system, the delay and/or latency of messages is relatively small and the likelihood that the call will be interrupted or dropped during the handover is reduced. In contrast, the delay and/or latency of messages may be relatively large and the likelihood that the call will be interrupted or dropped during the handover may be increased if the first system is loosely coupled to the second system. However, tightly coupled systems typically have more complex designs and implementations than loosely coupled systems. Tightly coupled systems may also deviate from conventional standards for telecommunication systems.

The present invention is directed to addressing the effects of one or more of the problems set forth above.

SUMMARY OF THE INVENTION

In one embodiment of the instant invention, a method is provided for soft vertical handovers. The method includes requesting a handover from a first wireless network that operates according to a first protocol to a second wireless network that operates according to a second protocol, the first protocol being different than the second protocol, via a first wireless telecommunication link that operates according to the first protocol. The method also includes forming, in response to the handover request, a second wireless telecommunications link according to the first and second protocols, the second wireless telecommunications link being concurrent with the first wireless telecommunication link. The method further includes dropping the first wireless telecommunications link after forming the second wireless telecommunications 0link.

In another embodiment of the present invention, a method is provided for soft vertical handovers. The method includes requesting a handover from a first wireless network that operates according to a first protocol to a second wireless network that operates according to a second protocol, the first protocol being different than the second protocol, via a first wireless telecommunication link that operates according to the first and second protocols. The method also includes forming, in response to the handover request, a second wireless telecommunications link according to the second protocol, the second wireless telecommunications link being concurrent with the first wireless telecommunication link. The method further includes dropping the first wireless telecommunications link after forming the second wireless telecommunications link.

BRIEF DESCRIPTION OF THE DRAWINGS

The invention may be understood by reference to the following description taken in conjunction with the accompanying drawings, in which like reference numerals identify like elements, and in which.

Figure 1:
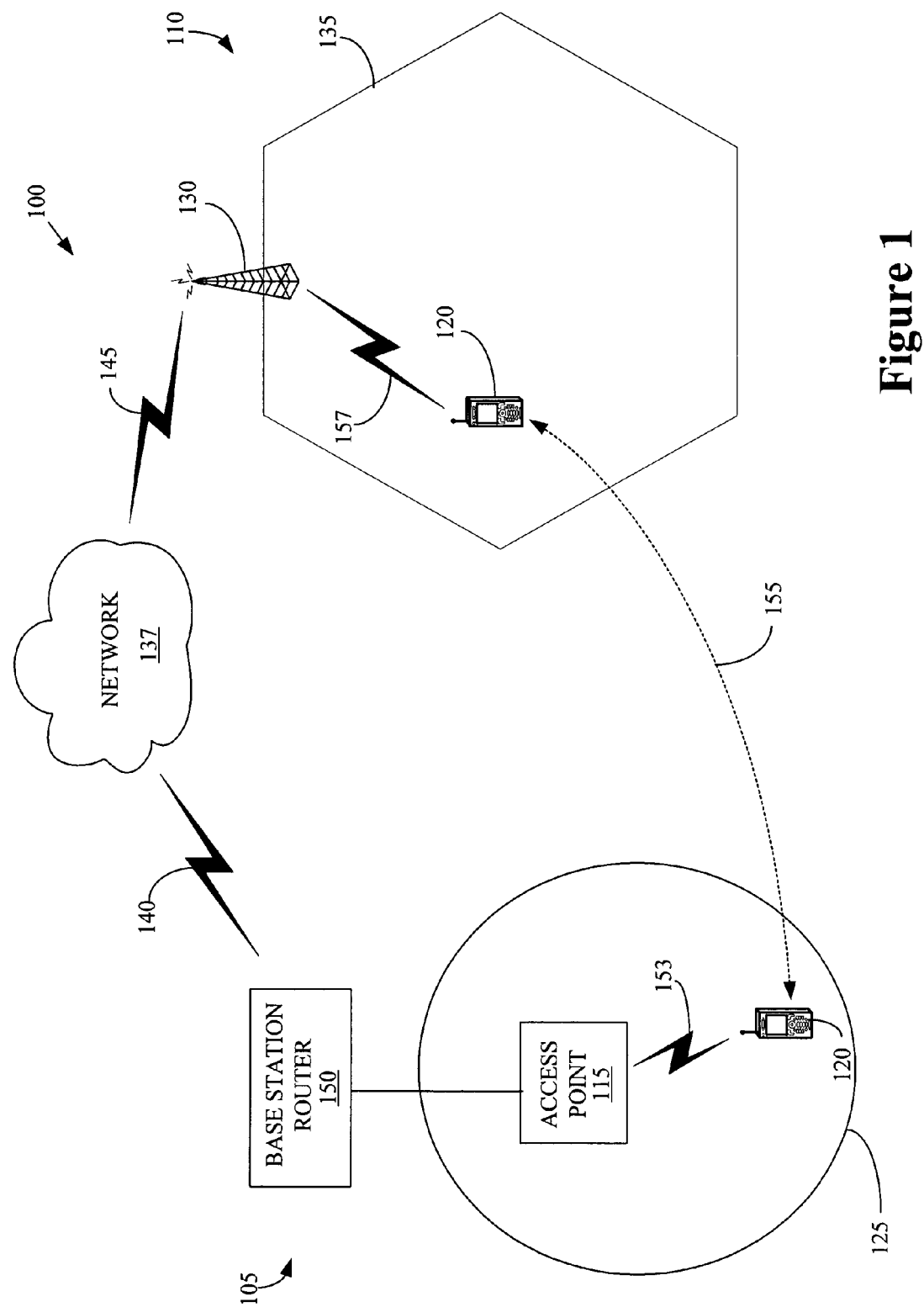
FIG. 1 shows an exemplary embodiment of a system including first and second networks coupled through a third network, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows one exemplary embodiment of a system 100 including first and second networks 105, 110. Devices in the first and second networks 105, 110 exchange messages according to first and second protocols, respectively. In the illustrated embodiment, the first network 105 is a Bluetooth network including an access point 115 that may establish concurrent wireless telecommunications links with one or more mobile units 120 in a geographic area, such as a hot spot 125, using the Bluetooth protocol. In the illustrated embodiment, the second network 110 is a cellular telephone network including a base station 130 that may establish concurrent wireless telecommunications links with one or more mobile units 120 in a geographic area, such as a cell 135, using a Universal Mobile Telephony System (UMTS) protocol. Persons of ordinary skill in the art should appreciate that, in alternative embodiments, the hot spot 125 and the cell 135 may or may not overlap.

In the interest of clarity, the present invention will be described assuming that the first network 105 is a Bluetooth-enabled network and the second network 110 is a UMTS network. However, persons of ordinary skill in the art should appreciate that the present invention may be practiced with a variety of first and second networks 105, 110 that permit messages to be exchanged among devices in the networks 105, 110 according to first and second protocols, respectively, wherein the first protocol is different than the second protocol. For example, the first network 105 may operate according to one of the 802.11 protocols and the second network 110 may operate according to a Global System for Mobile Telephony (GSM) protocol, a Personal Communication System (PCS) protocol, a Voice over Internet Protocol (VoIP), and the like. Moreover, as will be discussed in detail below, the UMTS network 110 will be assumed to be a master network and the Bluetooth network will be assumed to be a slave network. However, persons of ordinary skill in the art should appreciate that, in alternative embodiments, either network may function as the master or the slave network.

The networks 105, 110 are communicatively coupled to a network 137 via the interfaces 140, 145, respectively. Accordingly, the networks 105, 110 are also communicatively coupled to each other via the interfaces 140, 145 and the network 137. In one embodiment, the interfaces 140, 145 are fixed, wired connections. However, the present invention is not limited to wired interfaces 140, 145. In alternative embodiments, the interfaces 140, 145 may be wireless, or air, interfaces 140, 45. For example, a wireless back-haul may be implemented.

The interfaces 140, 145 transmit messages according to a common protocol. For example, in the illustrated embodiment, the interfaces 140, 145 transmit messages according to a UMTS protocol. However, persons of ordinary skill in the art should appreciate that the present invention is not limited to interfaces 140, 145 that transmit messages according to a UMTS protocol. In various alternative embodiments, the interfaces 140, 145 may transmit messages according to any desirable wireless telecommunications protocol. Furthermore, in various alternative embodiment, the network 137 may be any desirable type of network including, but not limited to, a Plain Old Telephone System (POTS), a cellular telephone system, a satellite network, a Public Switched Telephone Network (PSTN), and an Internet (e.g. for Voice over Internet Protocols, VoIP). Moreover, the network 137 may include a variety of elements not shown in FIG. 1. For example, the network 137 may include routers, hubs, switching centers, network controllers, and the like.

The first and second networks 105, 110 may be tightly or loosely coupled, depending on the nature of the network 137. For example, the first (Bluetooth) network 105 may be loosely coupled to the second (UMTS) network 110 by a Public Switched Telephone Network (PSTN) or an Internet (e.g. for Voice over Internet Protocols, VoIP) via the interfaces 140, 145 operated by one or more wireless operator networks.

In this example, the Bluetooth voice channel is a wireless extension to a fixed line, and the Bluetooth network and the one or more wireless operator networks are completely separate. There are no mobility attributes between the first and second networks 105, 110 and only the call control aspects of signaling are terminated in the Bluetooth network 105. In handovers from one network to another, authentication back to the parent network typically does not take place and routing calls via a number associated with the parent network is not typically possible. The delay and jitter for this system is dictated by the quality of the network 137 (e.g. the PSTN or the Internet connection) and is not dominated by the wireless operator network.

Alternatively, the first (Bluetooth) network 105 may be tightly coupled to the second (UMTS) network 110 if the networks 105, 110 include some signaling functionality that would permit them to be known by, and/or partly controlled by, the wireless operator that controls the interfaces 140, 145. For example, the first network 105 could include a Bluetooth-enabled Node-B that exposes an Iub interface back to a Radio Network Controller (RNC) that is controlled by the wireless operator that controls the air interfaces 140, 145, as well as the second network 110. Flexibility of configuration may be limited since only the Node-B functionality is present. For another example, the first network 105 could include an entity that has attributes of a combination of a Node-B and an RNC. In this example, the RNC attributes of the Bluetooth entity may allow RNC peer-to-peer and RNC-to-Mobile-Switching-Center (MSC) communication back into the wireless operator network 135. In this configuration, the tightness of the coupling could be relaxed provided that some managed connectivity back to the parent network was present. However, all of the signaling would have to be routed back to the parent network. Accordingly, there may be some dependence on the parent network for management of the system. Thus, the tightness of the coupling might remain and the total flexibility of the system might become impaired.

In yet another alternative embodiment, the first network 105 may have sufficient signaling capabilities to be able function in either a tight or loose coupling regime. In this respect, the first network 105 would have a combination of Node-B, RNC, and MSC functionality or, in the case of a VoIP network 137, the first network 105 would have a combination of Serving General Packet Radio Service (GPRS) Support Node (SGSN) and Gateway GPRS Support Node (GGSN) functionality. In this configuration, the flexibility of the first (Bluetooth) network 105 is enhanced to the point where the first network 105 is effectively stand-alone. All of the required signaling to manage a call can be terminated within the first (Bluetooth) network 105. Thus, in one embodiment, the first network 105 can act as a peer network of the parent wireless operator network or part of the wireless operator's network (e.g. numbering schemes are preserved intact and roaming between systems is then possible). The ownership and type of connectivity back to the wireless operator network would then determine the tightness or looseness of the system.

The system 100 includes a base station router 150 that is communicatively coupled to the access point 115 by any desirable wired and/or wireless connection. Although the base station router 150 is only connected to a single access point 115 in FIG. 1, persons of ordinary skill in the art should appreciate that the base station router 150 may be coupled to any desirable number of access points 115. The base station router 150 modifies signals received from the access point 115 and/or the network 137 so that messages may be transmitted via a wireless telecommunications link between the mobile unit 120 and the network 137 according to the first and second protocols. For example, as will be discussed in detail below, the base station router 150 modifies messages so that they may be transmitted across an air interface 153 between the access point 115 and the mobile unit 120 in the hot spot 125 according to the Bluetooth protocol and across the interface 140 according to the UMTS protocol.

Although the base station router 150 may modify signals received from the access point 115 and/or the network 137 so that messages may be transmitted via a wireless telecommunications link between the mobile unit 120 and the network 137, the present invention is not limited to embodiments wherein the signal modification occurs in the base station router 150. In alternative embodiments, the access point 115 may modify signals so that messages may be transmitted via a wireless telecommunications link between the mobile unit 120 and the network 137. In other alternative embodiments, the base station router 150 and the access point 115 may each modify a portion of the signals so that messages may be transmitted via a wireless telecommunications link between the mobile unit 120 and the network 137.

In one embodiment, the base station router 150 supplies sufficient functionality so that the Bluetooth network 105 is a standalone system, in which case the type of coupling employed (e.g. tight or loose) becomes irrelevant. The quality of the coupling may then become a more important issue and the choice of configuration may be governed, at least in part, by delay and jitter constraints that must be preserved for voice services. For example, the latency of the system 100 should meet the ITU-T standards for end-to-end delay (150 ms) and the voice quality of the system 100 should be preserved (e.g. the voice quality should have a MOS greater than 3.5).

In the system 100, one network is designated as a master network over other disparate systems. For example, the second network 110 may be designated as the master network and the first network 105 may be designated as a slave network. By designating a master network, control signalling is preserved between the first and second networks 105, 110. For example, if the UMTS network is designated the master network over one or more Bluetooth networks, UMTS control signalling is preserved during soft handovers. Furthermore, as will be discussed in detail below, a frame numbering mechanism of the master system permeates the other disparate systems and may be used to facilitate soft handovers.

By implementing the functionality of the base station router 150, the one or more access points 115, and the aforementioned master-slave architecture for the system 100, handovers (indicated by the dotted line 155 in FIG. 1) of the mobile unit 120 between the first and second networks 105, 110 can be performed as continuous, i.e. soft, handovers. For example, the mobile unit 120 may request a handover from the second (e.g. UMTS) network 110 to the first (e.g. Bluetooth) network 105 over a first wireless telecommunications link that uses an air interface 157 and the interface 145, both of which operate according to the second (e.g UMTS) protocol. A second wireless telecommunications link that operates according to the first (e.g. Bluetooth) and second (e.g UMTS) protocols is then formed between the network 137 and the mobile unit 120, concurrent with the first wireless telecommunication link. Once the second wireless telecommunications link is formed, information may be transmitted using the first wireless telecommunication link, the second wireless telecommunication link, or both the first and the second wireless telecommunication links. The first wireless telecommunications link is dropped substantially after forming the second wireless telecommunication link. Persons of ordinary skill in the art should appreciate that this type of handover may also be referred to as a "make-then-break" handover.

In a soft handover, synchronisation exists between the mobile unit 120 and one or more nodes (not shown) in the network 137 such that copies of data can be received in the uplink and combined together to yield a single data item for onward transmission. Moreover, in the downlink, multiple copies can be sent to diverse transmission sites for simultaneous transmission to mobile units 120, which then select or combine the multiple arrivals to provide a single coherent replica of the data. Soft handoff of the mobile unit 120 in the system 100 thus amounts to adding new legs (transmission points in the downlink and reception points in the uplink) as and when required.

Figure 2:
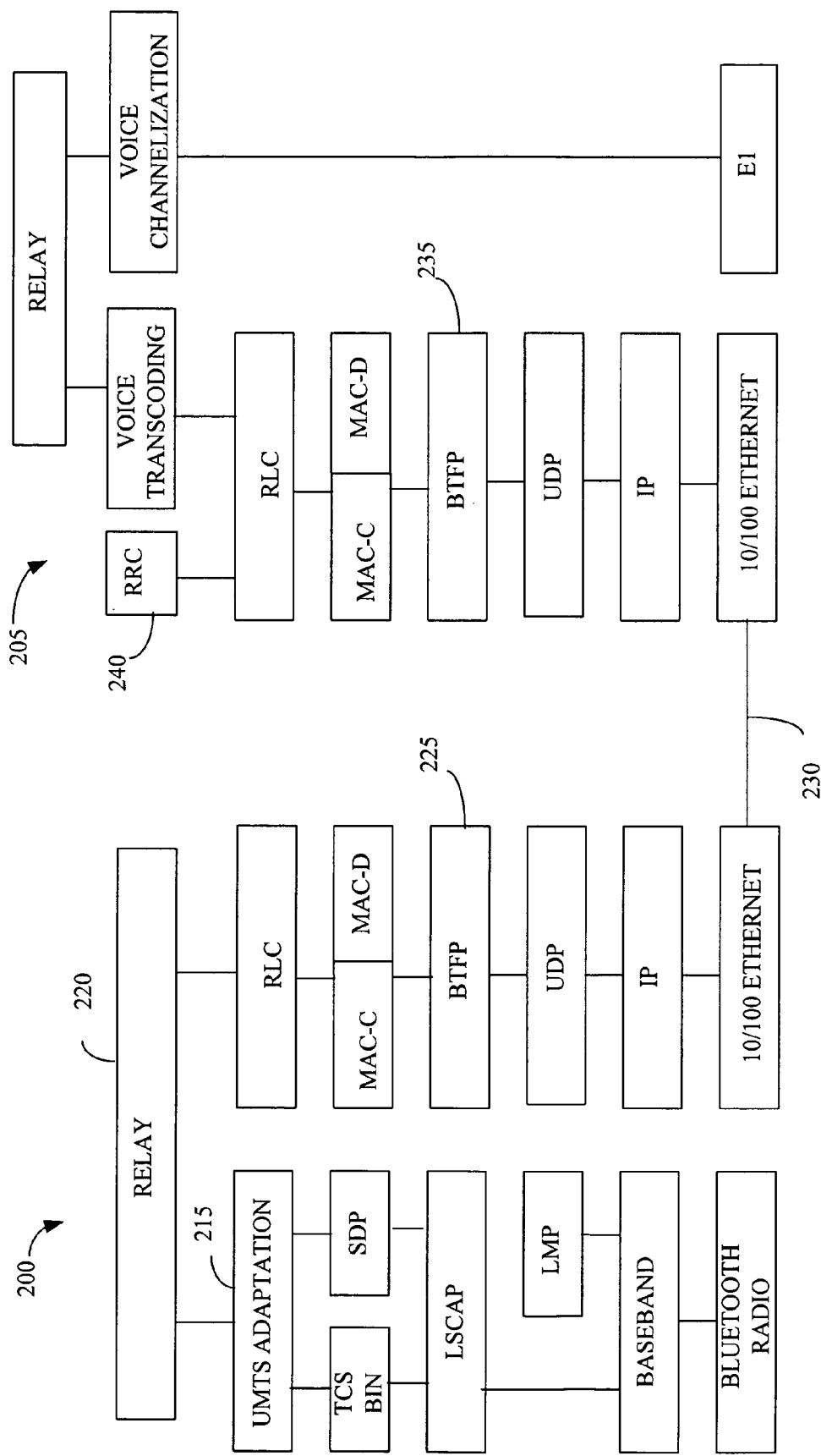
FIG. 2 conceptually illustrates an exemplary embodiment of a Bluetooth Node-B stack and a base station router stack, in accordance with the present invention.

FIG. 2 conceptually illustrates an exemplary embodiment of a Bluetooth Node-B stack 200 and a base station router stack 205 that may be used to implement a soft vertical handover from a first wireless network that operates according to a first protocol to a second wireless network that operates according to a second protocol. For example, the Bluetooth Node-B stack 200 and the base station router stack 205 may be used to implement soft vertical handovers between a Bluetooth network and a UMTS cellular network, such as the first and second networks 105, 110 shown in FIG. 1. Persons of ordinary skill in the art should appreciate that some layers of the stacks 200, 205 are well-known and thus, in the interest of clarity, will not be described in detail. Persons of ordinary skill in the art should also appreciate that, in the interest of clarity, only the Bluetooth Node-B stack 200 and the base station router stack 205 are described herein. However, the present invention is not limited to the Bluetooth Node-B and base station router stacks 200, 205 and in alternative embodiments other stacks corresponding to other protocols may be used.

The Bluetooth node-B stack 200 includes a Bluetooth radio layer, a baseband layer, a link manager protocol (LMP) layer, a Logical Link Control and Adaptation Protocol (L2CAP) layer, a Telephony Control protocol Specification Binary (TCS Bin) layer, and a Service Discovery Protocol (SDP) layer, in accordance with the Bluetooth specification. The Bluetooth node-B stack 205 also includes a UMTS Adaptation layer 215. As will be discussed in detail below, the UMTS adaptation layer 215 modifies signals exchanged with one or more Bluetooth-enabled devices to allow the devices to roam onto other networks, such as from a Bluetooth network to a UMTS network. For example, the UMTS adaptation layer 215 may include an adaptation of a Headset Profile via the addition of call control and mobility functionality such that it appears to be a UMTS mobile unit. The UMTS adaptation layer 215 may also include the adaptation of the TCS profile via the addition of the call control and mobility functionality such that a UMTS mobile unit appears to be presented to the system. The UMTS Adaptation layer 215 is coupled to a relay 220, which is coupled to a Radio Link Control (RLC) and Media Access Control (MAC-C, MAC-D) layers.

A Bluetooth Framing Protocol (BTFP) layer 225 is also provided. One function of the BTFP layer 225 is to preserve frame numbering among the first and second networks. For example, the BTFP layer 225 may insure that the frame numbering mechanism of the master system (e.g. the UMTS network) permeates the other disparate slave systems, such as Bluetooth networks. In the illustrated embodiment, signalling is based on the UMTS protocol but channels are based on the Bluetooth protocol and so the BTFP layer 225 may identify an equivalent UMTS Bluetooth radio bearer corresponding to the Bluetooth channel. The BTFP layer 225 indicates the physical channel associated with the signalling and data and allows channels to be mapped from Bluetooth to UMTS. Thus, the BTFP layer 225 allows the base station router to identify signalling stimulus as though it were from a UMTS channel. The Bluetooth Framing protocol acts as the signalling bearer for the Bluetooth control application and the BTFP layer 225 defines various framing protocol endpoints and may provide an endpoint identifier to a Mapper (not shown in FIG. 2), as will be described in detail below. The BTFP layer 225 may be synchronized (or re-synchronized) in the event of a soft handover. The BTFP layer 225 may be coupled to a User Datagram Protocol (UDP) layer, an Internet Protocol (IP) layer, and a 10/100 Ethernet layer, which provides signals to, and receives signals from, an interface 230. For example, the 10/100 Ethernet layer may provide signals and/or packets to an Iub interface.

The base station router stack 205 may include a 10/100 Ethernet layer, which provides signals to, and receives signals from, the interface 230. The base station router stack 205 also may include an Internet Protocol (IP) layer, and a User Datagram Protocol (UDP) layer. In one embodiment, a Bluetooth Framing Protocol (BTFP) layer 235 is also provided. The BTFP layer 235 defines various framing-protocol endpoints and may provide an endpoint identifier to a Mapper (not shown in FIG. 2), as will be described in detail below. The framing-protocol endpoints defined by the BTFP layer 235 are consistent with the framing protocol endpoints defined by the BTFP layer 225. The BTFP layer 235 may be synchronized (or re-synchronized) in the event of a soft handover. The base station router stack 205 also includes a Radio Link Control (RLC) layer, Media Access Control (MAC-C, MAC-D) layers, a voice transcoding layer, a voice channelization layer, and an E1 layer.

A Radio Resource Control (RRC) layer 240 is also included in the base station router stack 205. In UMTS, identification of signalling to the RRC layer 225 may be achieved via one or more radio bearers. The signalling bearers are identified via a combination of MAC and RLC configurations. In one embodiment, the RRC layer 240 may be aware of a variety of signalling bearers including, but not limited to:

$RB_0$—all messages that are sent on the CCCH in RLC-TM $RB_1$—all messages that are sent on the DCCH in RLC-UM—RRC only signalling $RB_2$—all messages that are sent on the DCCH in RLC-AM—RRC only signalling $RB_3$—all messages that are sent on the DCCH in RLC-AM—that are direct transfers i.e. carry higher layer signalling (SMS, MM, SM and CC).

The correct identification of the radio bearer by the RRC layer 240 allows automatic identification of the signalling channels in the uplink. Furthermore, addressing the correct radio bearer in the downlink will ensure that the signalling is received correctly on the appropriate mobile unit.

Figure 3:
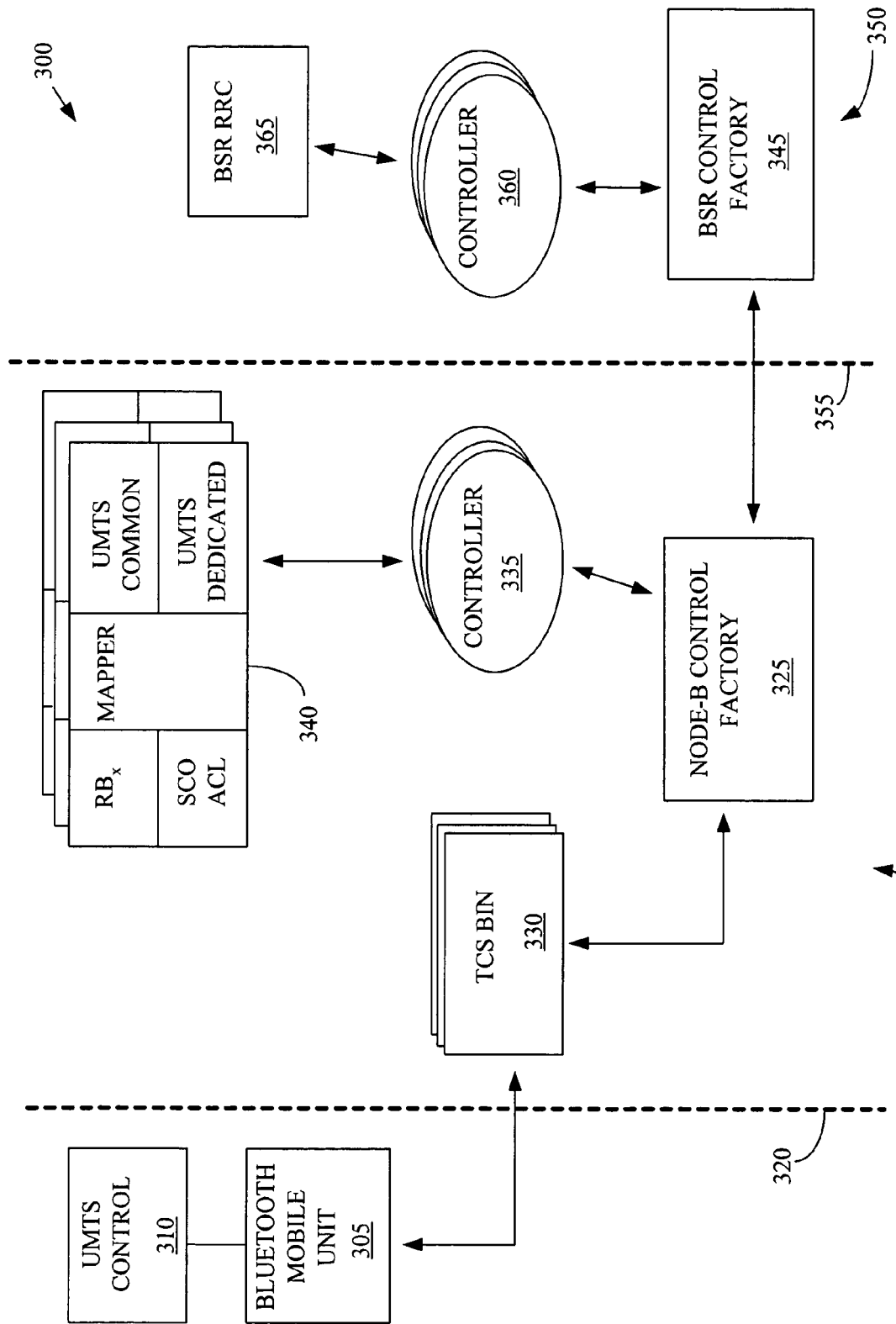
FIG. 3 conceptually illustrates one embodiment of control plane interactions in a system, such as the system shown in FIG. 1, in accordance with the present invention.

FIG. 3 conceptually illustrates one embodiment of control plane interactions in a system 300. The system 300 may be used to implement soft vertical handovers between, e.g a master UMTS network and one or more slave Bluetooth networks, such as described above. In operation, a Bluetooth mobile unit 305 having a UMTS control block 310 establishes communication with a Bluetooth Node-B 315 across an air interface 320, which leads to discovery of a TCS Bin. Upon initial detection of the Bluetooth mobile unit 305, a Node-B control factory 325 sets up the signalling paths across the air interface 320. For example, the equivalent of a UMTS RACH may be established over the air interface 320. The initial RACH is received by the TCS Bin master (not shown), which creates an instance of a TCS bin layer 330 for the new mobile unit 305 and assigns a unique (to the system 300) Channel Identifier number. The TCS Bin master may also signal the Node-B control factory 325 that a new TCS Bin layer 330 has been activated and passes a TCS Bin handle to the Node-B control factory 325 which identifies the TCS Bin layer 330. In one embodiment, one instance of the TCS bin layer 330 exists for each mobile unit 305.

The Node-B control factory 325 also creates one instance of a controller 335 for each Bluetooth mobile unit 305 and associates the TCS Bin handle with the controller 335. The controllers 335 may create a mapper 340 for each Bluetooth mobile unit 305. In one embodiment, the controllers 335 receive inverse RLC/MAC construct messages using the Bluetooth framing protocol, construct RLC/MAC protocol layers, such as shown in FIG. 5, and provide an endpoint identifier to the mappers 340. The mappers 340 map the UMTS signalling over the air interface 320, which is identified by the radio bearer field, to the appropriate RLC/MAC endpoint that has already been constructed by the appropriate controller 335. The mapper 340 may also map UMTS data over the air interface 320 from the appropriate TCS bin end point to the appropriate RLC/MAC endpoint that has already been constructed by the appropriate controller 335. The mapper 340 then maps the framing protocol endpoints to the relevant TCS Bin end point. For example, using the TCS Bin handle, the mappers 340 can identify the correct TCS Bin $RB_0$ and $RB_1$ endpoints and the framing protocol messaging endpoints for the air interface 320. Thus, the signalling bearers can be identified and managed appropriately. For example, the addition of the MAC and RLC layers may be performed so that the correct RBx signalling channel can be identified and mapped to the appropriate TCS Bin 330. The controllers 335 may also perform necessary synchronisation of the Bluetooth framing protocol in the event of a soft handover, as discussed above.

The Node-B control factory 325 also contacts a BSR control factory 345 in a base station router 350 across an interface 355. In one embodiment, a control plane application is held at the RRC level within the base station router 350 and at the level of the TCS bin in the Bluetooth Node-B 315. In one embodiment, initial contact could be via a known port number, handshaking would then occur which may include SIM-like information held in the Bluetooth Node-B 315. Once authentication has occurred, further control application communication between the Node-B control factory 325 and the BSR control factory 345 may rebound to another dedicated socket and communication may be ciphered between the two entities using, e.g. Internet protocol security. During the initial communication, the Node-B control factory 325 and the BSR control factory 345 set up various control channels. In one embodiment, the Node-B control factory 325 and the BSR control factory 345 establish the framing protocol endpoints that indicate the desired conventional signalling bearers, with the addition of the relevant RLC and MAC layers.

The BSR control factory 345 may create, among other things, a controller 360 for each Bluetooth mobile unit 305 and a BSR Radio Resource Controller (RRC) 365 for communications over the interface 355 to the appropriate Bluetooth TCS Bin layer 330. The controller 360 may create the appropriate $RB_0$ and $RB_1$ endpoints ($RB^i_1$ and $RB^i_0$, where i refers to the instance of the TCS Bin layer 330) into the RRC layer 365 of the base station router 350. The BSR RRC 365 knows to respond on $RB^i_1$ on receipt of signalling from $RB^i_0$, as well as being able to do the appropriate RACH CCCH signal mapping After the initial detection and channel mapping has been achieved, subsequent behaviour (channel requests) can be reduced to the task of managing the creation/deletion of the appropriate signalling and traffic radio bearers for the dedicated control and traffic channels for the Bluetooth Node-B 315, i.e. the DCCH and DTCH. In one embodiment, the BSR control factory 345 is given a priori knowledge of the BSR Radio Resource Controller (RRC) 365 and the dedicated control and traffic channels are created in response to signalling received by the BSR Radio Resource Controller (RRC) 365. Since the BSR Radio Resource Controller (RRC) 365 has to create, in this embodiment, an RLC and MAC layer in anticipation of a signalling response to be received over the DCCH, the BSR Radio Resource Controller (RRC) 365 therefore knows that the Bluetooth Node-B control factory 325 has to create the relevant uplink RLC and MAC layers for the DCCH. Thus, the Bluetooth Node-B control factory 325 receives signalling from the BSR control factory 345 that is the inverse of the protocol layers that have just been created by the BSR control factory 345.

By implementing the control plane interactions in the system 300 as described above, the management of the mobile unit 305 may be performed in a single and consistent way, and the RLC and MAC layers may function as they would in conventional UMTS-based communications. For example, uplink frame selection (soft hand off) can be performed on the frames from the mobile unit 305 and, in the downlink, appropriate translation from UMTS channels to Bluetooth channels can be identified. In short, the Bluetooth Node-B 315 may be seen as just another Node-B and signalling/data can still be sent to and received from the mobile unit 305 over the air interface 320 because signalling and data can be identified from, and directed to, the appropriate physical, transport, and logical channels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method, comprising:
   requesting a handover from a master wireless network that operates according to a first protocol to a slave wireless network that operates according to a second protocol, the first protocol being different than the second protocol, via a first wireless telecommunication link that operates according to the first protocol;
   forming, in response to the handover request, a second wireless telecommunications link according to the first and second protocols using a frame numbering sequence determined by the master wireless network, the second wireless telecommunications link being concurrent with the first wireless telecommunication link; and
   dropping the first wireless telecommunications link after forming the second wireless telecommunications link.

2. The method of claim 1, wherein the first protocol is at least one of a Universal Mobile Telephony (UMTS) protocol, Global System for Mobile Telephony (GSM) protocol, Personal Communication System (PCS) protocol, and a Voice over Internet protocol (VoIP).

3. The method of claim 1, wherein the second protocol is at least one of a Bluetooth protocol and an 802.11 protocol.

4. The method of claim 1, wherein the slave wireless network comprises multiple Bluetooth-enabled devices within a defined set that communicate with each other by sending messages to and from a master device within the set according to a Bluetooth protocol.

5. The method of claim 1, wherein forming the second wireless telecommunications link according to the first and second protocols comprises forming the second wireless telecommunications link according to the first and second protocols such that control signalling is preserved between the first and second networks and the control signalling is provided over the second wireless telecommunications link based on the first protocol.

6. The method of claim 1, further comprising transmitting information using the first wireless telecommunication link, the second wireless telecommunication link, or both the first and the second wireless telecommunication links substantially after forming the second wireless telecommunications link.

7. A method, comprising:
   requesting a handover from a slave wireless network that operates according to a first protocol to a master wireless network that operates according to a second protocol, the first protocol being different than the second protocol, via a first wireless telecommunication link that operates according to the first and second protocols;
   forming, in response to the handover request, a second wireless telecommunications link according to the second protocol using a frame numbering sequence determined by the master wireless network, the second wireless telecommunications link being concurrent with the first wireless telecommunication link; and
   dropping the first wireless telecommunications link after forming the second wireless telecommunications link.

8. The method of claim 7, wherein the first protocol is at least one of a Bluetooth protocol and an 802.11 protocol.

9. The method of claim 7, wherein the second protocol is at least one of a Universal Mobile Telephony (UNITS) protocol, Global System for Mobile Telephony (GSM) protocol, Personal Communication System (PCS) protocol, and a Voice over Internet protocol (VoIP).

10. The method of claim 7, wherein the slave wireless network comprises multiple Bluetooth-enabled devices within a defined set that communicate with each other by sending messages to and from a master device within the set according to a Bluetooth protocol.

11. The method of claim 7, wherein forming the second wireless telecommunications link according to the second protocol comprises forming the second wireless telecommunications link according to the second protocol such that control signalling is preserved between the first and second networks and the control signalling is provided over the second wireless telecommunications link based on the first protocol.

12. The method of claim 7, further comprising transmitting information using the first wireless telecommunication link, the second wireless telecommunication link, or both the first and the second wireless telecommunication links substantially after forming the second wireless telecommunications link.

* * * * *